(12) United States Patent
Wang

(10) Patent No.: US 11,430,035 B2
(45) Date of Patent: Aug. 30, 2022

(54) SELF-ADAPTIVE FAIR SYSTEM

(71) Applicant: Customized Technology Co., Ltd., Taichung (TW)

(72) Inventor: Shui-Mu Wang, Taichung (TW)

(73) Assignee: Customized Technology Co., Ltd., Taichung (TW)

( * ) Notice: Subject to any disclaimer, the term of this patent is extended or adjusted under 35 U.S.C. 154(b) by 183 days.

(21) Appl. No.: 17/029,027

(22) Filed: Sep. 22, 2020

(65) Prior Publication Data

US 2022/0044295 A1    Feb. 10, 2022

(30) Foreign Application Priority Data

Aug. 10, 2020 (TW) .................. 109127061

(51) Int. Cl.
| | |
|---|---|
| *G06Q 30/00* | (2012.01) |
| *G06Q 30/06* | (2012.01) |
| *B60P 3/025* | (2006.01) |
| *G06Q 30/02* | (2012.01) |

(52) U.S. Cl.
CPC ........ *G06Q 30/0621* (2013.01); *B60P 3/0257* (2013.01); *G06Q 30/0205* (2013.01); *G06Q 30/0635* (2013.01)

(58) Field of Classification Search
CPC ........... G06Q 30/0621; G06Q 30/0205; G06Q 30/0635; B60P 3/0257
See application file for complete search history.

(56) References Cited

U.S. PATENT DOCUMENTS

| | | | | |
|---|---|---|---|---|
| 2016/0239815 | A1* | 8/2016 | Vargas | G06Q 40/02 |
| 2018/0018651 | A1* | 1/2018 | Nelson | G07F 17/26 |
| 2018/0165737 | A1* | 6/2018 | Love | G06Q 30/0621 |
| 2018/0292537 | A1* | 10/2018 | Sromin | G02B 26/101 |
| 2020/0242674 | A1* | 7/2020 | Chen | G06Q 30/0601 |

FOREIGN PATENT DOCUMENTS

CN    109300238 A    2/2019

OTHER PUBLICATIONS

Sands, Jamie, et al. "Meaningful Personalization at a self-service kiosk." Proceedings of HCI 2007 The 21st British HCI Group Annual Conference University of Lancaster, UK 21. 2007.*

* cited by examiner

*Primary Examiner* — Kathleen Palavecino
(74) *Attorney, Agent, or Firm* — Winston Hsu (57) ABSTRACT

A self-adaptive fair system includes a mobile carrier, a first object, a processing unit and a production station. The mobile carrier is for selectively moving to or being moved to a first location. The first object is exhibited at the first location through the mobile carrier. The first object is accessed by a first user at the first location for selectively generating a first user design. The processing unit is for receiving a first order inputted by the first user and transmitting the first order. The first order is related to the first user design. The production station located outside the mobile carrier and signally connected to the processing unit for producing a second object according to the first order.

9 Claims, 6 Drawing Sheets

SELF-ADAPTIVE FAIR SYSTEM

BACKGROUND OF THE INVENTION

1. Field of the Invention

The present disclosure relates to a self-adaptive fair system, and more particularly, to a self-adaptive fair system which can move to or be moved to a particular location to allow a user at the particular location to actually experience a product and generate a custom order based on an experience of the user.

2. Description of the Prior Art

In general, a product can be sold through a physical store or an online e-commerce. The physical store allows a customer to experience the product in person, but incapable of generating a custom order based on an experience result, such that the experience result of the customer cannot be immediately introduced into an ensuing product design. The online e-commerce only provides product sales information on the internet, and does not allow the customer to experience in person, which is incapable of generating the custom order based on the experience result either.

SUMMARY OF THE INVENTION

The present disclosure aims at providing a self-adaptive fair system which can move to or be moved to a particular location to allow a user at the particular location to actually experience a product and generate a custom order based on an experience of the user to solve the aforementioned drawback.

According to one embodiment, a self-adaptive fair system includes a mobile carrier, a first object, a processing unit and a production station. The mobile carrier is for selectively moving to or being moved to a first location. The first object is exhibited at the first location through the mobile carrier, and the first object is accessed by a first user at the first location for selectively generating a first user design. The processing unit is for receiving a first order inputted by the first user and transmitting the first order, wherein the first order is related to the first user design. The production station is located outside the mobile carrier, signally connected to the processing unit and for producing a second object according to the first order.

These and other objectives of the present invention will no doubt become obvious to those of ordinary skill in the art after reading the following detailed description of the preferred embodiment that is illustrated in the various figures and drawings.

DETAILED DESCRIPTION

In order to enable the skilled persons in the art to better understand the present disclosure, hereinafter preferred embodiments with drawings are provided for illustrating the present disclosure and the effect to be achieved. It should be noted that the drawings are simplified schematic diagrams. Therefore, only elements related to the present disclosure and combination relationship thereof are shown to provide a clearer description of the basic framework or implementation methods of the present disclosure. The actual elements and configuration may be more complicated. In addition, for the sake of convenience, the number of the components in the drawings could be unequal the actual number thereof, the shape and size of the components may not draw in proportion to the actual shape and size, and the proportion thereof can be adjusted according to design requirements.

The directional terminology in the following embodiments, such as top, bottom, left, right, front or back, is used with reference to the orientation of the Figure(s) being described. As such, the directional terminology is used for purposes of illustration and is in no way limiting.

The ordinal number terminology, such as first, second and third, can be used to describe various elements, and the elements are not limited by definition of the ordinal number terminology. The ordinal number terminology is used to distinguish one element from other elements in the specification, and the ordinal number terminology of the element in the claims is arranged according to the claimed order and could be different from that in the specification. As such, a first element recited in the following description could be a second element in the claims.

Figure 1:
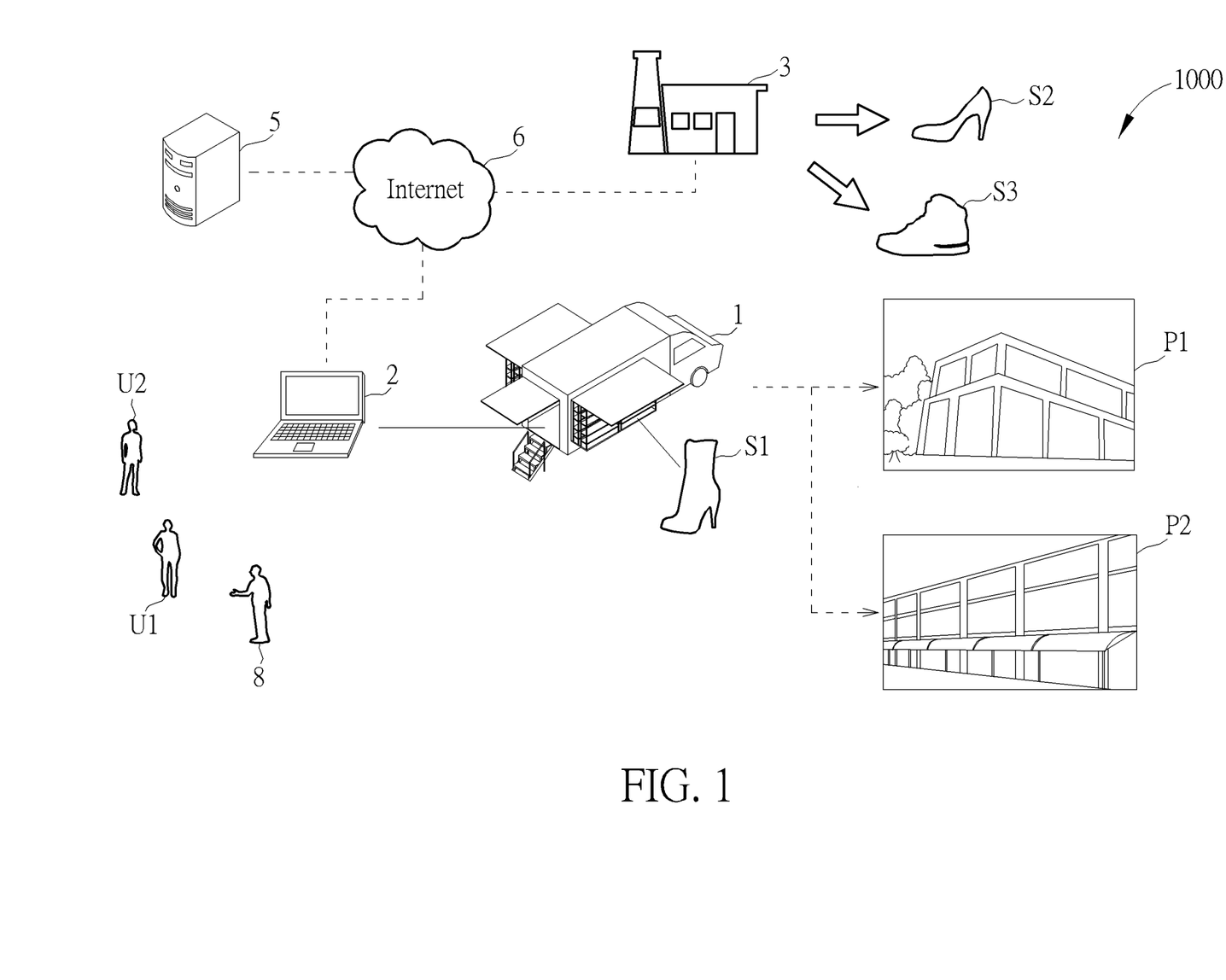
FIG. 1 is a schematic diagram showing a self-adaptive fair system according to one embodiment of the present disclosure.

Please refer to FIG. 1, which is a schematic diagram showing a self-adaptive fair system 1000 according to one embodiment of the present disclosure. The self-adaptive fair system 1000 includes a mobile carrier 1, a processing unit 2 and a production station 3. The mobile carrier 1 is for selectively moving to or being moved to a first location P1. In the embodiment, the first location P1 is a market, which is only exemplary, and the present disclosure is not limited thereto. For example, the first location P1 can also be a sidewalk area or a hypermarket with a relatively high visitors flow.

Figure 2:
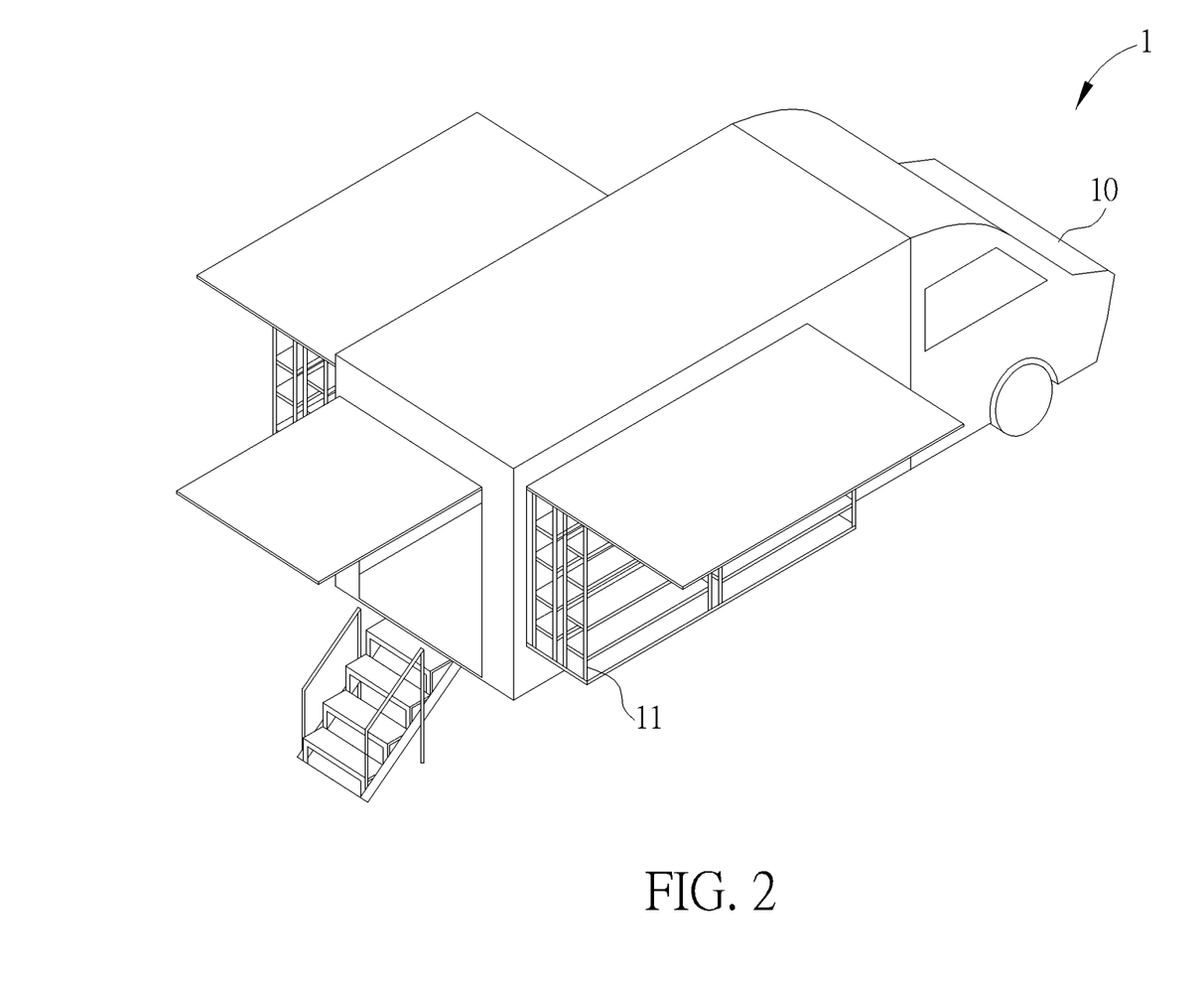
FIG. 2 is a schematic diagram showing a mobile carrier in an extended state according to the embodiment of the present disclosure.
Figure 3:
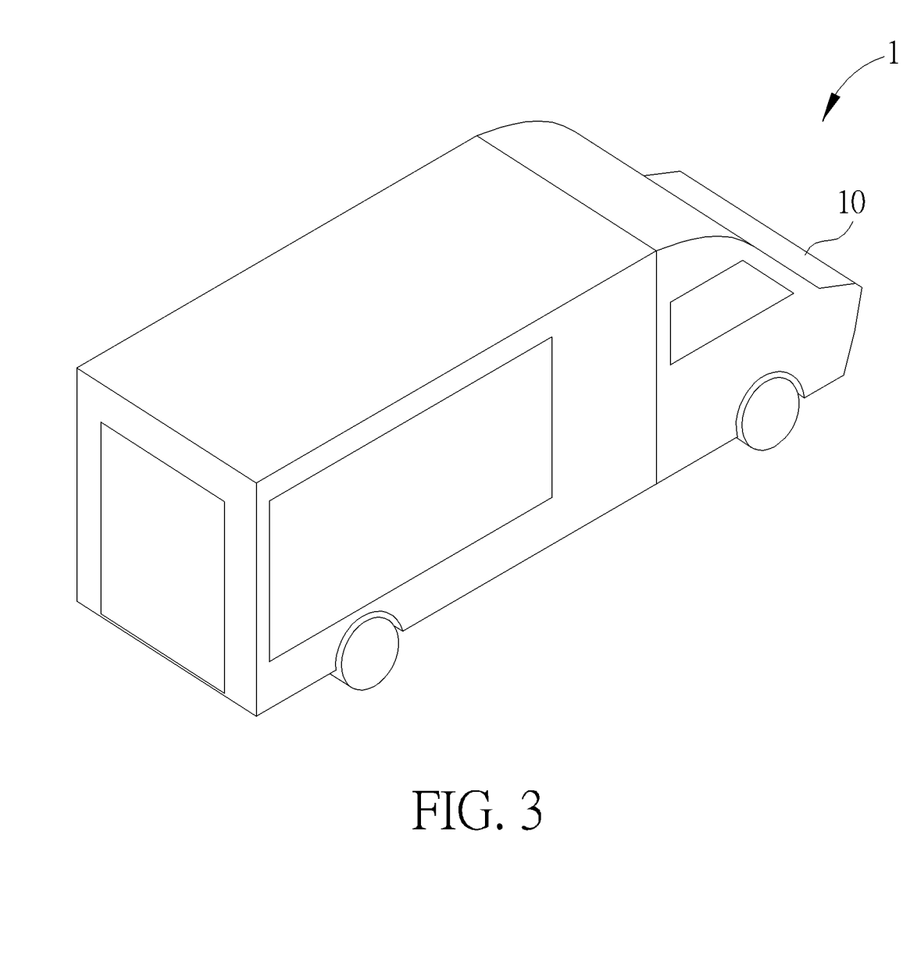
FIG. 3 is a schematic diagram showing the mobile carrier in a closed state according to the embodiment of the present disclosure.

Please refer FIGS. 1 to 3. FIG. 2 is a schematic diagram showing the mobile carrier 1 in an extended state according to the embodiment of the present disclosure. FIG. 3 is a schematic diagram showing the mobile carrier 1 in a closed state according to the embodiment of the present disclosure. In the embodiment, the mobile carrier 1 is a van truck, which is exemplary and is configured to move to the first location P1. The van truck (i.e., the mobile carrier 1) can include a main body 10 and a storage unit 11 disposed in the main body 10. The processing unit 2 is detachably disposed in the main body 10. In the embodiment, the processing unit 2 is a portable electronic device (such as a notebook), which is only exemplary, and the present disclosure is not limited thereto. For example, the processing unit 2 can also be a desktop computer, a smartphone or a tablet computer.

In the embodiment, the main body 10 is a truck body of the van truck, and the storage unit 11 is a display cabinet disposed in the truck body. For example, the storage unit 11 can be a storage cabinet with a plurality of partitions, which is movably disposed in the main body 10 through a slide rail or linkage mechanism. The storage unit 11 is movable relative to the main body 10 between a closed position shown in FIG. 3 and an extended position shown in FIG. 2. The storage unit 11 is configured to accommodate a first object S1, such that the first object S1 can be transported to the first location P1 and can be exhibited at the first location P1 through the mobile carrier 1.

Furthermore, during the moving process of the mobile carrier 1, the storage unit 11 can be at the closed position shown in FIG. 3 and does not protrude from the main body 10. As such, the storage unit 11 can be received in the main body 10 during the moving process, and collisions with foreign objects can be prevented. When the mobile carrier 1 arrives at the first location P1, the storage unit 11 can be at the extended position shown in FIG. 2 and protrudes from the main body 10. As such, the first object S1 can be exposed from the main body 10 and exhibited at the first location P1.

Figure 4:
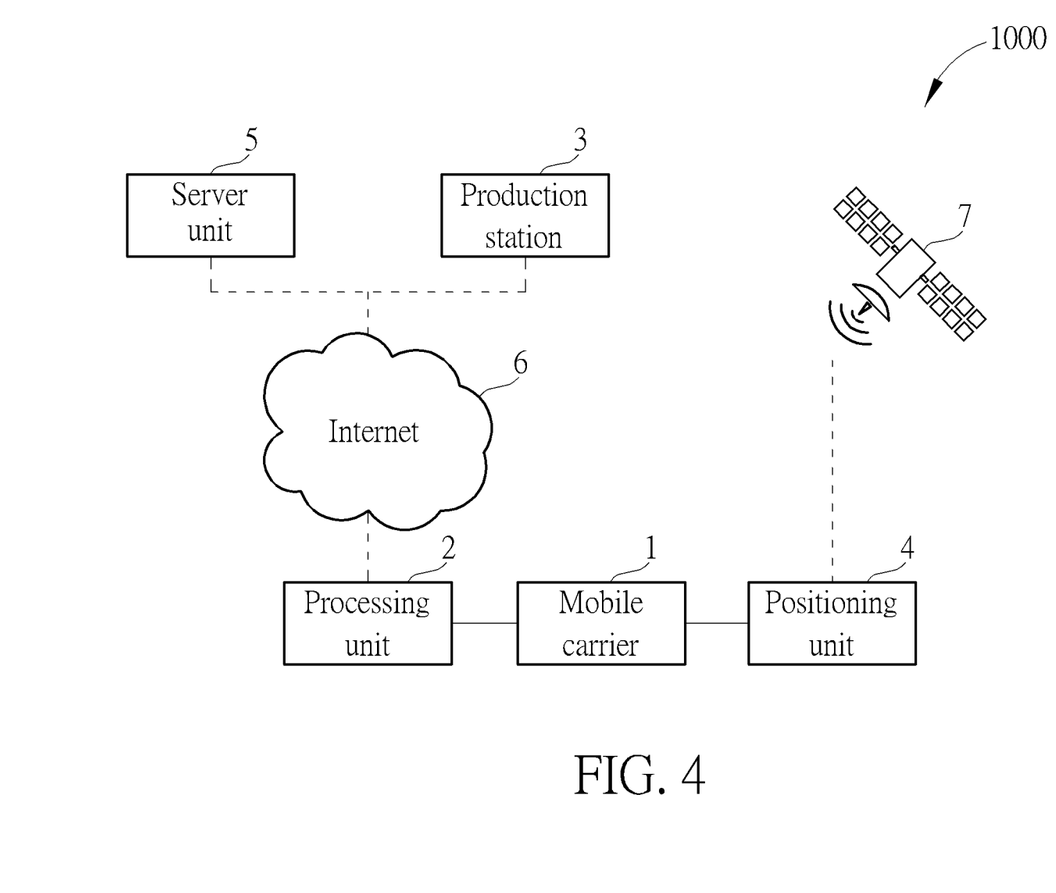
FIG. 4 is a functional block diagram of the self-adaptive fair system according to the embodiment of the present disclosure.

Please refer FIGS. 1 to 4. FIG. 4 is a functional block diagram of the self-adaptive fair system 1000 according to the embodiment of the present disclosure. The processing unit 2 is signally connected to a production station 3 and a server unit 5 through an internet 6. In the embodiment, the first object S1 is a shoe, and the production station 3 is a shoe factory for producing the shoe, both of which are exemplary, and the present disclosure is not limited thereto. For example, the first object S1 can be a piece of clothing, and the production station 3 can be a clothes factory for producing the piece of clothing. For another example, the first object S1 can be an article of sporting goods (such as a ball, a cap, a bag, a glove and a cushion), and the production station 3 can be a factory for producing the article of sporting goods. Furthermore, the mobile carrier 1 (such as the van truck) is configured for transporting the first object S1 (such as the shoe) produced by the production station 3 (such as the shoe factory) to the first location P1 (such as the market) to exhibit. Therefore, the mobile carrier 1 can be a transport tool independent from the production station 3 and located outside the production station 3.

The self-adaptive fair system 1000 can further include a positioning unit 4. The positioning unit 4 is coupled to the mobile carrier 1 and is for generating position information related to a location where the mobile carrier 1 is located. The position information related to the location where the mobile carrier 1 is located can be first position information related to the first location P1 or second position information related to a second location P2. Moreover, as shown in FIG. 1, the second location P2 can be a shopping street, which is exemplary, and the present disclosure is not limited thereto. For example, the second location P2 can also be a shopping plaza, a venue of a big event or an industrial park.

Specifically, the positioning unit 4 can be a global positioning system (GPS), which can generate the first position information or the second position information through a communications device 7 (such as an artificial satellite), but the present disclosure is not limited thereto. For example, the positioning unit 4 can be a mobile communication unit, which can generate the first position information or the second position information through the communications device 7 (such as a 3G mobile communication base station or a 5G mobile communication base station). Alternatively, the positioning unit 4 can be a wireless fidelity (Wi-Fi) unit, which can generate the first position information or the second position information through the communications device 7 (such as a wireless base station).

<Scenario 1—Single Consumer at the Same Location>

As shown in FIGS. 1 and 4, when the mobile carrier 1 moves to a first location P1 (such as the market), the storage unit 11 of the mobile carrier 1 can be extended outwardly from an inside of the main body 10 (FIG. 2), such that the first object S1 disposed in the storage unit 11 can be accessed by a first user U1 located at the first location P1. At this time, a seller 8 that moves with the mobile carrier 1 can explain to the first user U1 when the first user U1 accesses the first object S1 for selectively generating a first user design (which can be expressed through spoken language, graphical representation or written language). Take the first object S1 being a sample shoe as an example. When the sample shoe (i.e., the first object S1) is accessed or tried on by the first user U1, the seller 8 can further adjust the first user design, based on the sample shoe, according to an access or try-on experience result of the first user U1, such as the softness of the sole and the style of the shoe appearance. At the same time, the self-adaptive fair system 1000 provides the processing unit 2 (such as the notebook) to receive a first order related to the first user design inputted by the first user U1 and transmit the first order to the server unit 5 through the internet 6. Afterwards, the server unit 5 can generate first production information based on the first order, and transmit the first production information to the production station 3.

The production station 3 can produce a second object S2 based on the first production information which is generated according to the first order. As such, the self-adaptive fair system 1000 according to the present disclosure can generate the first user design based on the access or try-on experience result of the first user U1, and produce a customized product (i.e., the second object S2) based on the first order, which is related to the first user design.

In the embodiment, the first order includes a plurality of decoration codes related to decoration patterns of the first object S1, a plurality of color codes related to colors of the first object S1, a size code related to a body part size of the first user U1, or a physiological code related to a height and a weight of the first user U1. Take the sample shoe as an example. The first order can include a plurality of decoration codes related to vamp patterns of the sample shoe (i.e., the first object S1), a plurality of color codes related to colors of the shoe parts of the sample shoe, a size code related to a foot size of the first user U1, and a physiological code related to a body mass index (BMI) of the first user U1, all of which are exemplary, and the present disclosure is not limited thereto.

In the embodiment, the first production information includes a print file related to the plurality of decoration codes, a material file related to the plurality of color codes, or a molding parameter related to at least one of the size code and the physiological code. Take the sample shoe as an example. The first production information can include a print file related to the plurality of decoration codes which is further related to the vamp patterns, a material file related to the plurality of color codes which is further related to the colors of the shoe parts, and a molding parameter related to the size code which is further related to the foot size, all of which are exemplary, and the present disclosure is not limited thereto.

Figure 5:
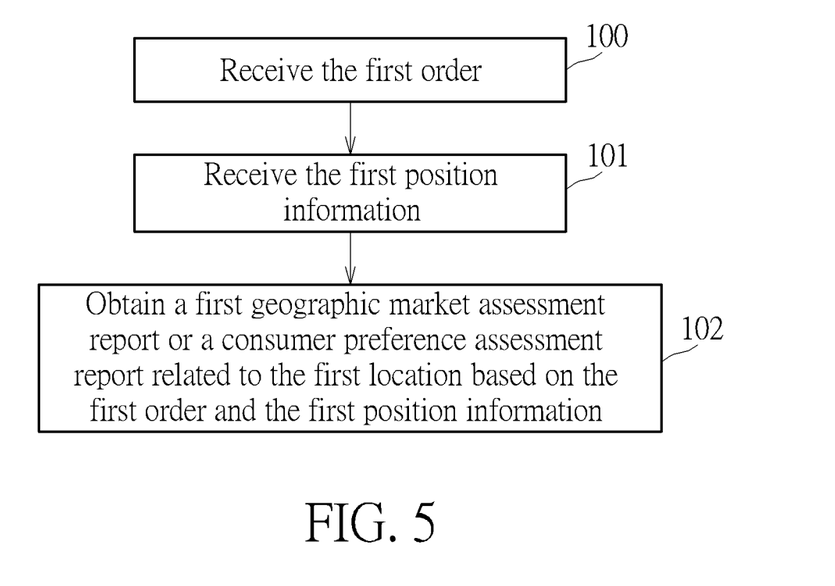
FIG. 5 is a flow chart showing the self-adaptive fair system conducting an assessment analysis for the same consumer at the same location according to the embodiment of the present disclosure.

Furthermore, during communicating with the first user U1 at the first location P1, the self-adaptive fair system 1000 according to the present disclosure can further conduct an assessment analysis about consumer preference or geographic market for the same consumer. Please refer to FIGS. 1, 4 and 5. FIG. 5 is a flow chart showing the self-adaptive fair system 1000 conducting the assessment analysis for the same consumer at the same location according to the embodiment of the present disclosure, which includes steps as follows.

Step 100: Receive the first order.

Step 101: Receive the first position information.

Step 102: Obtain a first geographic market assessment report or a consumer preference assessment report related to the first location P1 based on the first order and the first position information.

Specifically, when the mobile carrier 1 arrives at the first location P1, the positioning unit 4 can generate the first position information (such as the latitude-longitude coordinate) related to the first location P1, and the processing unit 2 can transmit the first position information and the first order to the server unit 5. After receiving the first order (Step 100) and the first position information (Step 101), the server unit 5 can further analyze and obtain the first geographic market assessment report or the consumer preference assessment report related to the first location P1 based on the first order and the first position information (Step 102). In the embodiment, the server unit 5 can be a third-party platform, such as an application programming interface (API) of a software development company, and the present disclosure is not limited thereto. The server unit 5 can also be a cloud computing platform, such as Google Cloud Platform (GCP), Amazon Web Service (AWS), Microsoft Azure, Oracle Cloud Infrastructure (OCI), etc.

<Scenario 2—Different Consumers at the Same Location>

As shown in FIG. 1 and FIG. 4, after the production station 3 producing the second object S2 based on the first production information which is generated according to the first order, the second object S2 can be disposed in the storage unit 11 of the mobile carrier 1 (e.g., FIG. 2), or the second object S2 can be dealt by digital visualization and presented through the processing unit 2, such that the second object S2 can be accessed by a second user U2 at the same location (i.e., the first location P1). At this time, the seller 8 that moves with the mobile carrier 1 can explain to the second user U2 when the second user U2 accesses the second object S2 for selectively generating a second user design (which can be expressed through spoken language, graphical representation or written language). At the same time, the self-adaptive fair system 1000 provides the processing unit 2 to receive a second order related to the second user design inputted by the second user U2 and transmit the second order to the server unit 5 through the internet 6. Afterwards, the server unit 5 can generate second production information based on the second order, and transmit the second production information to the production station 3.

The production station 3 can produce a third object S3 based on the second production information which is generated according to the second order. As such, the self-adaptive fair system 1000 according to the present disclosure can generate the second user design according to the access or try-on experience result of the second user U2, and produce another customized product (i.e., the third object S3) based on the second order, which is related to the second user design.

Figure 7:
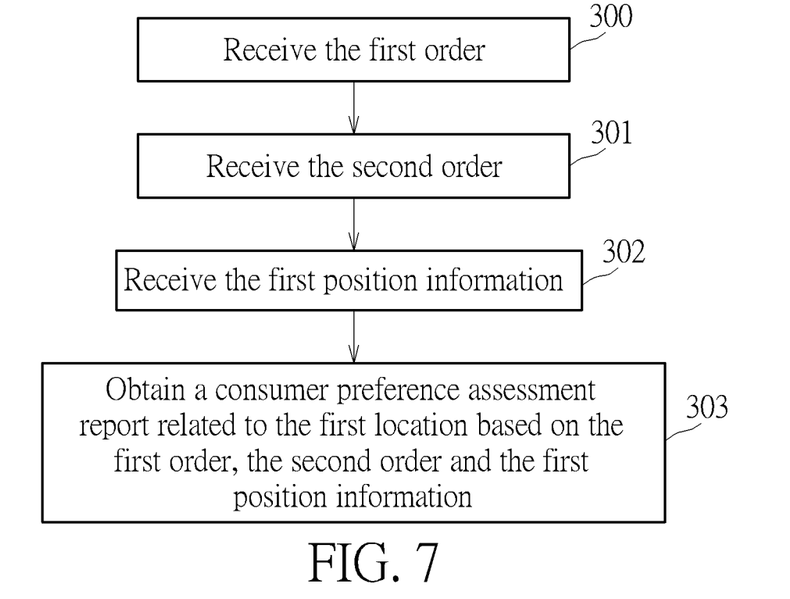
FIG. 7 is a flow chart showing the self-adaptive fair system conducting a consumer preference assessment analysis related to the first location for different consumers at the same location according to the embodiment of the present disclosure.

Furthermore, during communicating with the first user U1 and the second user U2 at the first location P1, the self-adaptive fair system 1000 according to the present disclosure can further conduct a consumer preference assessment analysis related to the first location P1 for different consumers at the same location. Please refer to FIGS. 1, 4 and 7. FIG. 7 is a flowchart showing the self-adaptive fair system 1000 conducting the consumer preference assessment analysis related to the first location P1 for different consumers at the same location according to the embodiment of the present disclosure, which includes steps as follows.

Step 300: Receive the first order.

Step 301: Receive the second order.

Step 302: Receive the first position information.

Step 303: Obtain a consumer preference assessment report related to the first location P1 based on the first order, the second order and the first position information.

Specifically, when the mobile carrier 1 arrives at the first location P1, the positioning unit 4 can generate the first position information (such as the latitude-longitude coordinate) related to the first location P1, and the processing unit 2 can transmit the first position information, the first order and the second order to the server unit 5. After receiving the first order (Step 300), the second order (Step 301) and the first position information (Step 302), the server unit 5 can further analyze and obtain the consumer preference assessment report related to the first location P1 based on the first order, the second order and the first position information (Step 303). In the embodiment, the consumer preference assessment report would try to find the similarities between different consumers in the same geographic region.

<Scenario 3—Different Consumers at Different Locations>

As shown in FIG. 1 and FIG. 4, after the production station 3 produced the second object S2 based on the first production information generated according to the first order, the second object S2 can be disposed in the storage unit 11 of the mobile carrier 1 (e.g., FIG. 2), or the second object S2 can be dealt by digital visualization and presented through the processing unit 2. The mobile carrier 1 can selectively move to a second location P2 different from the first location P1, such that the second object S2 accordingly exhibited at the second location P2 can be accessed by a second user U2 at the second location P2. At this time, the seller 8 that moves with the mobile carrier 1 can explain to the second user U2 when the second user U2 accesses the second object S2 or the first object S1 for selectively generating a second user design (which can be expressed through spoken language, graphical representation or written language). At the same time, the self-adaptive fair system 1000 provides the processing unit 2 to receive a second order related to the second user design inputted by the second user U2 and transmit the second order to the server unit 5 through the internet 6. Afterwards, the server unit 5 can generate second production information based on the second order, and transmit the second production information to the production station 3.

The production station 3 can produce a third object S3 based on the second production information which is generated according to the second order. As such, the self-adaptive fair system 1000 according to the present disclosure can generate the second user design according to the access or try-on experience result of the second user U2, and produce another customized product (i.e., the third object S3) based on the second order, which is related to the second user design.

Figure 6:
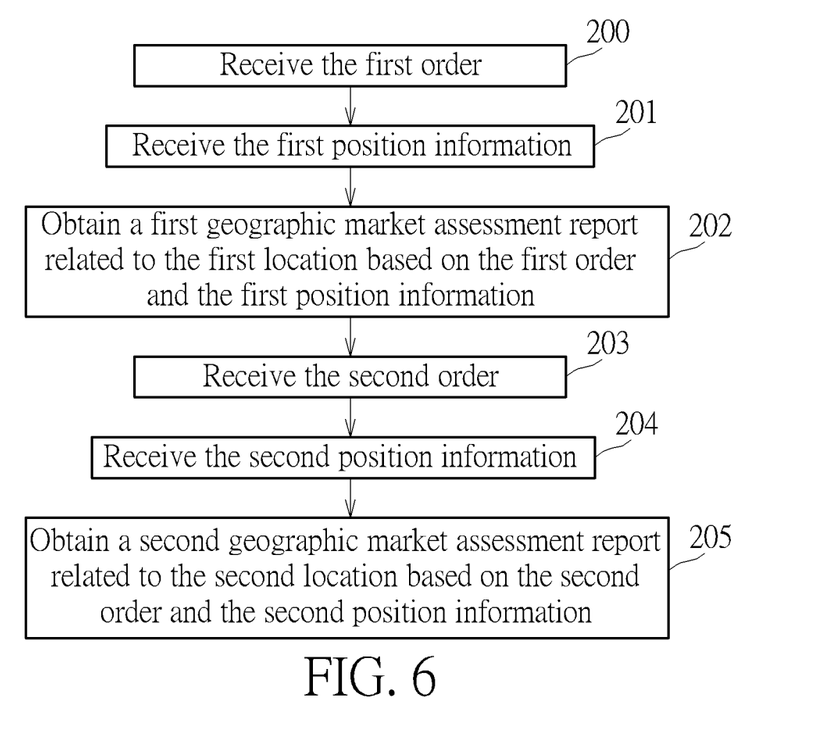
FIG. 6 is a flow chart showing the self-adaptive fair system conducting a first geographic market assessment analysis related to a first location and a second geographic market assessment analysis related to a second location for different consumers at different locations according to the embodiment of the present disclosure.

Furthermore, during communicating with the first user U1 at the first location P1 and the second user U2 at the second location P2, the self-adaptive fair system 1000 according to the present disclosure can further conduct a first geographic market assessment analysis related to the first location P1 and a second geographic market assessment analysis related to the second location P2 for different consumers at different locations. Please refer to FIGS. 1, 4 and 6. FIG. 6 is a flow chart showing the self-adaptive fair system 1000 conducting the first geographic market assessment analysis related to the first location P1 and the second geographic market assessment analysis related to the second location P2 for different consumers at different locations according to the embodiment of the present disclosure, which includes steps as follows.

Step 200: Receive the first order.
Step 201: Receive the first position information.
Step 202: Obtain a first geographic market assessment report related to the first location P1 based on the first order and the first position information.
Step 203: Receive the second order.
Step 204: Receive the second position information.
Step 205: Obtain a second geographic market assessment report related to the second location P2 based on the second order and the second position information.

Specifically, when the mobile carrier 1 arrives at the first location P1, the positioning unit 4 can generate the first position information (such as the latitude-longitude coordinate) related to the first location P1, and the processing unit 2 can transmit the first position information and the first order to the server unit 5. After receiving the first order (Step 200) and the first position information (Step 201), the server unit 5 can further analyze and obtain the first geographic market assessment report related to the first location P1 based on the first order and the first position information (Step 202). When the mobile carrier 1 arrives at the second location P2, the positioning unit 4 can generate the second position information (such as another latitude-longitude coordinate) related to the second location P2, and the processing unit 2 can transmit the second position information and the second order to the server unit 5. After receiving the second order (Step 203) and the second position information (Step 204), the server unit 5 can further analyze and obtain the second geographic market assessment report related to the second location P2 based on the second order and the second position information (Step 205). In the embodiment, the geographic market assessment reports would try to find the differences between different consumers in different geographic regions.

Figure 8:
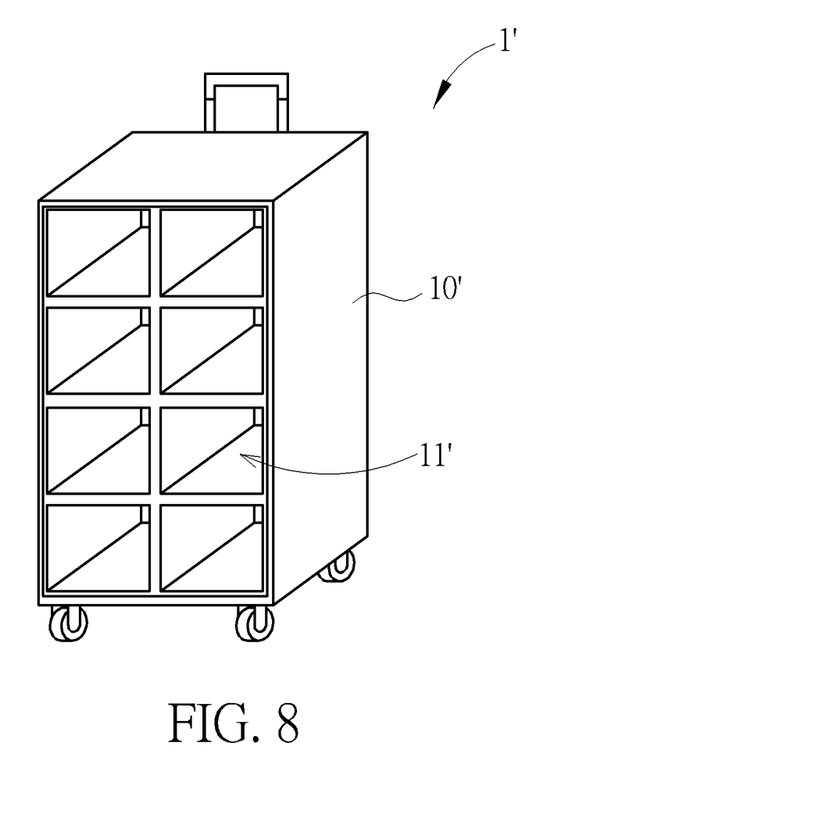
FIG. 8 is a schematic diagram showing a mobile carrier according to another embodiment of the present disclosure.

Please refer to FIGS. 4 and 8. FIG. 8 is a schematic diagram showing a mobile carrier 1' according to another embodiment of the present disclosure. The mobile carrier 1' can be a movable display cabinet which is configured to be moved to the first location P1. The mobile carrier 1' can include a main body 10' and a storage unit 11'. In the embodiment, the main body 10' can be a cabinet body of the movable display cabinet, and the storage unit 11' is an accommodating space inside the cabinet body formed by a plurality of partitions. The processing unit 2 can be a portable electronic device (such as a notebook or a tablet computer. The portable electronic device provides an input interface for a first user U1 to input a first order. Other details of the embodiment can be the same as that of the aforementioned embodiment and are not repeated herein.

Compared to prior art, the self-adaptive fair system of the present disclosure includes a mobile carrier capable of selectively moving to or being moved to a first location and providing a first object accessed by a first user so as to selectively generate a first user design. Moreover, the self-adaptive fair system of the present disclosure includes a processing unit for receiving a first order based on the first user design inputted by the first user and capable of producing a second object different from the first object. As such, the self-adaptive fair system of the present disclosure can move to or can be moved to a particular location to allow a user at the particular location to actually experience a product and generate a custom order based on an experience of the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A self-adaptive fair system, comprising:
a mobile carrier for selectively moving to or being moved to a first location;
a first object exhibited at the first location through the mobile carrier, the first object being accessed by a first user at the first location for selectively generating a first user design;
a processing unit for receiving a first order inputted by the first user and transmitting the first order, wherein the first order is related to the first user design; and
a production station located outside the mobile carrier, signally connected to the processing unit and for producing a second object according to the first order, wherein the second object is accessed by a second user for selectively generating a second user design, the processing unit is for receiving a second order inputted by the second user and transmitting the second order, the second order is related to the second user design, the production station is for producing a third object according to the second order.

2. The self-adaptive fair system of claim 1, wherein the second user is located at a second location different from the first location, the self-adaptive fair system further comprises:
a positioning unit coupled to the mobile carrier, wherein the positioning unit is for generating first position information related to the first location and second position information related to the second location; and
a server unit signally connected to the processing unit, the server unit being configured to:
receive the first order;
receive the first position information;
obtain a first geographic market assessment report related to the first location based on the first order and the first position information;
receive the second order;
receive the second position information; and
obtain a second geographic market assessment report related to the second location based on the second order and the second position information.

3. The self-adaptive fair system of claim 1, wherein the second user is located at the first location, the self-adaptive fair system further comprises:
a positioning unit coupled to the mobile carrier, wherein the positioning unit is for generating first position information related to the first location; and a server unit signally connected to the processing unit, the server unit being configured to:
  receive the first order;
  receive the second order;
  receive the first position information; and
  obtain a consumer preference assessment report related to the first location based on the first order, the second order and the first position information.

4. The self-adaptive fair system of claim 1, further comprising:
  a positioning unit coupled to the mobile carrier, wherein the positioning unit is for generating first position information related to the first location; and
  a server unit signally connected to the processing unit, the server unit being configured to:
  receive the first order;
  receive the first position information; and
  obtain a first geographic market assessment report or a consumer preference assessment report related to the first location based on the first order and the first position information.

5. The self-adaptive fair system of claim 1, further comprising:
  a server unit signally connected to the processing unit and the production station, wherein the server unit is for generating first production information based on the first order, and the first production information is provided to the production station to produce the second object based thereon.

6. The self-adaptive fair system of claim 5, wherein the first order comprises a plurality of decoration codes related to decoration patterns of the first object, a plurality of color codes related to colors of the first object, a size code related to a body part size of the first user, or a physiological code related to a height and a weight of the first user, the first production information comprises a print file related to the plurality of decoration codes, a material file related to the plurality of color codes, or a molding parameter related to at least one of the size code and the physiological code.

7. The self-adaptive fair system of claim 1, wherein the mobile carrier is a van truck and comprises a main body and a storage unit disposed in the main body, the processing unit is detachably disposed in the main body, and the first object is disposed in the storage unit.

8. The self-adaptive fair system of claim 7, wherein the storage unit is movably disposed in the main body, and the storage unit is movable relative to the main body between a closed position and an extended position, when the storage unit is at the closed position, the storage unit does not protrude from the main body, when the storage unit is at the extended position, the storage unit protrudes from the main body.

9. The self-adaptive fair system of claim 1, wherein the mobile carrier is a movable display cabinet, the processing unit is a portable electronic device, the first object is disposed in the movable display cabinet, the portable electronic device provides an input interface for the first user to input the first order.

* * * * *